United States Patent
Lin et al.

(10) Patent No.: US 9,467,333 B2
(45) Date of Patent: Oct. 11, 2016

(54) CONTROL SYSTEM AND METHOD FOR NETWORK SERVICE AND FUNCTION OF VIRTUAL DESKTOP APPLICATION IN CLOUD

(71) Applicant: Chunghwa Telecom Co., Ltd, Yangmei City, Taoyuan County (TW)

(72) Inventors: Jhih-yan Lin, Yangmei (TW); Chao-Chun Yen, Yangmei (TW); Chu-Chuan Lee, Yangmei (TW)

(73) Assignee: CHUNGHWA TELECOM CO., LTD, Yangmei, Taoyuan County (TW)

( * ) Notice: Subject to any disclaimer, the term of this patent is extended or adjusted under 35 U.S.C. 154(b) by 38 days.

(21) Appl. No.: 13/890,624

(22) Filed: May 9, 2013

(65) Prior Publication Data

US 2013/0304880 A1  Nov. 14, 2013

(30) Foreign Application Priority Data

May 11, 2012  (TW) .............................. 101116795 A

(51) Int. Cl.
 *G06F 15/177* (2006.01)
 *H04L 12/24* (2006.01)
 *H04L 29/06* (2006.01)

(52) U.S. Cl.
 CPC ........... *H04L 41/08* (2013.01); *H04L 41/0803* (2013.01); *H04L 63/08* (2013.01)

(58) Field of Classification Search
 CPC ... H04W 4/001; H04W 4/003; H04W 4/005; H04W 4/008; H04W 88/04; H04W 8/00; H04W 8/005; G06K 9/6218; G06Q 10/06; H04M 1/00; H04M 1/72527; H04M 1/7253; G06F 9/45533; G06F 9/45558; H04L 29/06047; H04L 41/08; H04L 41/0803
 USPC ....... 709/204, 220, 224, 221, 223, 226, 212, 709/216, 217, 222, 227, 246; 700/275, 286; 718/1
 See application file for complete search history.

(56) References Cited

U.S. PATENT DOCUMENTS

| | | | |
|---|---|---|---|
| 8,943,506 B2* | 1/2015 | Tang | G06F 9/45558 718/1 |
| 2006/0047791 A1* | 3/2006 | Bahl | 709/220 |
| 2008/0072311 A1* | 3/2008 | Mullick et al. | 726/15 |
| 2008/0077680 A1* | 3/2008 | Dellarole et al. | 709/220 |
| 2011/0145886 A1* | 6/2011 | McKenzie et al. | 726/1 |
| 2011/0277005 A1* | 11/2011 | Pedlow et al. | 725/109 |
| 2012/0143730 A1* | 6/2012 | Ansari et al. | 705/27.1 |
| 2013/0174242 A1* | 7/2013 | Snow et al. | 726/7 |
| 2014/0052864 A1* | 2/2014 | Van Der Linden et al. | 709/226 |
| 2014/0123270 A1* | 5/2014 | Liu et al. | 726/15 |

* cited by examiner

*Primary Examiner* — Hitesh Patel
(74) *Attorney, Agent, or Firm* — Muncy, Geissler, Olds & Lowe, P.C.

(57) ABSTRACT

A network access control method for a virtual desktop service is provided. The network access control method provides the user's virtual desktop IP allication, network access control, and user service group authorization. The network access control method provides a convenient and efficient way for virtual desktop service management.

5 Claims, 3 Drawing Sheets

CONTROL SYSTEM AND METHOD FOR NETWORK SERVICE AND FUNCTION OF VIRTUAL DESKTOP APPLICATION IN CLOUD

BACKGROUND OF THE INVENTION

1. Field of the Invention

The present invention discloses a control system and method for network service and function of virtual desktop, and in particular, to a control system and method for network service and function of virtual desktop in a cloud computing platform which can provide different users with different network service access permissions. A manager can use a network service access controller to configure different user service groups, network service, and IP routing access permissions for each user service group. The access controller can also process a configuration of a connection for a user based on the access permission given to that user. The present invention can give each user a different and independent IP. Therefore, the routing and network service configuration of users are individual and independent so as to avoid interference with each other, thereby enhancing flexibility and scalability of the system.

2. Description of the Prior Art

A company would establish a centralized information system and working environment of a database to protect information security and personal information of its employees, as well as to provide a remote desktop environment for the employees to connect to the central server for doing their work. There are at least two problems with this structure. First, when an employee is not in the inner office of the company, he/she has to establish a connection to pass through the internet and firewall into the intranet of the company via a virtual private network (VPN). The employee can have access permission to any information system in the intranet. In other words, there is no present technique or method to limit the access permission of an employee to access any inner information system of the company when the employee is logged in to the intranet by VPN or remote desktop technique. Also, each one of the remote users shares the same IP address to log into the same server by using the present remote desktop technique, and it is difficult for software or an information system to identify different users. Furthermore, the company cannot provide different access to different users according to their IDs. Taiwan patent application No. 200841.652 entitled, "STRATEGIES FOR SECURELY APPLYING CONNECTION POLICIES VIA A GATEWAY," discloses a strategy for security access permission in a system that includes providing a gateway to protect the access security of a server between clients and the remote desktop server. However, this strategy does not describe how to differentiate connections of different users and does not solve the access permission and IP routing problems of inner information network in a company.

In order to solve the above mentioned issues, the present invention permits each user to have a temporary and independent IP automatically when each user logs into the central desktop server. Furthermore, the present invention can generate a service management function automatically according to the temporary and independent IP of each user and limit the user in a specific service group to configure network service access according to the specific service group. This provides an efficient, flexible, and safe virtual desktop service for companies.

SUMMARY OF THE INVENTION

In order to provide a virtual desktop working environment which can solve the above problems, the present invention provides a control system and method for network service and function of a virtual desktop application in a cloud computing platform, comprising a service access controller, a network service control system, and a service management server.

A control system for a network service and function of a virtual desktop application in a cloud computing platform comprises a service access controller, installed on a desktop session server, wherein the desktop session server is a connected session server of a remote desktop or a virtual desktop. When a user uses the service access controller to issue a login request to the desktop session server, the service access controller is used for assisting with message communication. A service management server is connected with the service access controller and provides for a manager to configure user service groups and information of the user service groups. The service management server only accepts an inquiry for information of the user service groups from the service access controller. A network service control system connects the service access controller and accepts a network service configuration of the service access controller for the user.

In the embodiment, the service access controller is connected with the service management server via a network communication protocol to execute an inquiry for a service list, and the service management server only accepts the inquiry from the service access controller.

In the embodiment, the service access controller further comprises a dynamic host configuration protocol (DHCP) server which helps the user request distribution of an IP address for a virtual desktop service.

In the embodiment, the network service control system further comprises a service control from an OSI Interconnection Model Layer 3 to an OSI Interconnection Model Layer 7. The service access controller enables or disables the service control of the network service control system via a network communication protocol. When the service access controller enables the service control, the service access controller provides an IP address for a virtual desktop service and a service list. When the service access controller disables the service control, the service access controller disables IP routing for a desktop service of the network service control system.

The present invention also provides a control method for network service and function of virtual desktop application in a cloud computing platform, which comprises the following steps. A service access controller is used to receive a login request and to request distribution of an IP address for a virtual desktop service from a dynamic host configuration protocol (DHCP) server, and then to transmit a user authentication data, a client side equipment IP address, and information regarding the client side equipment to a service management server to execute an inquiry of an user authorization service list. After using the service access controller to obtain a distribution information of a virtual desktop IP address of the DHCP server and the user authorization service list of the service management server, the service access controller converts the user authorization service list to a control information format and transmits the control information format to a network service control system to execute a service control. The network service control system is used to receive the service control and to add the information of the service control to a control function of the network service control system to transmit a notification to the service access controller to finish the user control. The service access controller is used to receive the notification from the network service control system and to distribute the virtual desktop IP address via a desktop session server for the user to connect and finish the user login connection.

In the embodiment, the method further comprises the following steps. The service access controller is used to transmit an user desktop connection information to the network service control system and to request to terminate the service control. A notification is transmitted to the service access controller to finish the user control after the network service control system terminates the service control of the user connection IP address. The service access controller is used to notify the DHCP server to reclaim the IP address and to notify the desktop session server to terminate the user connection.

The service access controller provides the following functions:

1. Providing the client side equipment IP address and device type to the service management server to obtain a corresponding service list and distribute a virtual desktop service IP address to the client side equipment, thereby enabling different service access permissions according to different IPs and enhancing information security.

2. When the user is logging into the desktop session server, obtaining a virtual desktop service IP address from the DHCP server.

3. Establishing communication between the desktop session server and the network service control system. When a desktop server accepts an user connection, the service access controller is responsible for requesting a service permission from the network service control system.

The service management server can help the administrator configure user service access permissions to manage different users according to their virtual desktop service IP addresses. The service access controller can read a service list from the service management server for managing user access of network services. The network service control system obtains a service group list of a user from the service access controller after the user logs in to the workspace, and then helps the user obtain network access services of the virtual desktop service IP address.

According to an embodiment of the present invention, the virtual desktop network service environment works as follows:

1. A client side equipment requests a desktop session server to provide for workspace service login and going through ID verification;

2. The desktop session server requests an authentication server to verify the ID of client side equipment;

3. An acknowledgement message is returned to the desktop session server for logging permission after the authentication server confirms that the ID has passed ID verification;

4. The desktop session server requests that the DHCP server distribute an IP address for virtual desktop service via the service access controller;

5. The service access controller sends an inquiry to the service management server for a user service list by transmitting a client side equipment IP address and user verification data to the service management server. The service access controller then requests the service management server to initiate a service control by transmitting the service list and distributed virtual IP address;

6. The desktop session server configures the virtual desktop IP address to a corresponding user connection and allows the user to log into the virtual desktop after the service access controller receives the information of the distributed dynamic virtual desktop IP address. During connection, the user continues to use the virtual desktop IP address.

When the user terminates the virtual desktop connection, the service access controller transmits the termination message, disables the service control regarding the virtual desktop IP address, and requests the DHCP service to reclaim the distribution of the virtual desktop IP address.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood front the detailed description given hereinbelow and the accompanying drawings which are given by way of illustration only, and thus are not limitative of the present invention.

DETAILED DESCRIPTION OF THE PREFERRED EMBODIMENT

The advantages and innovative features of the invention will become more apparent from the following detailed description when taken in conjunction with the accompanying drawings.

Figure 1:
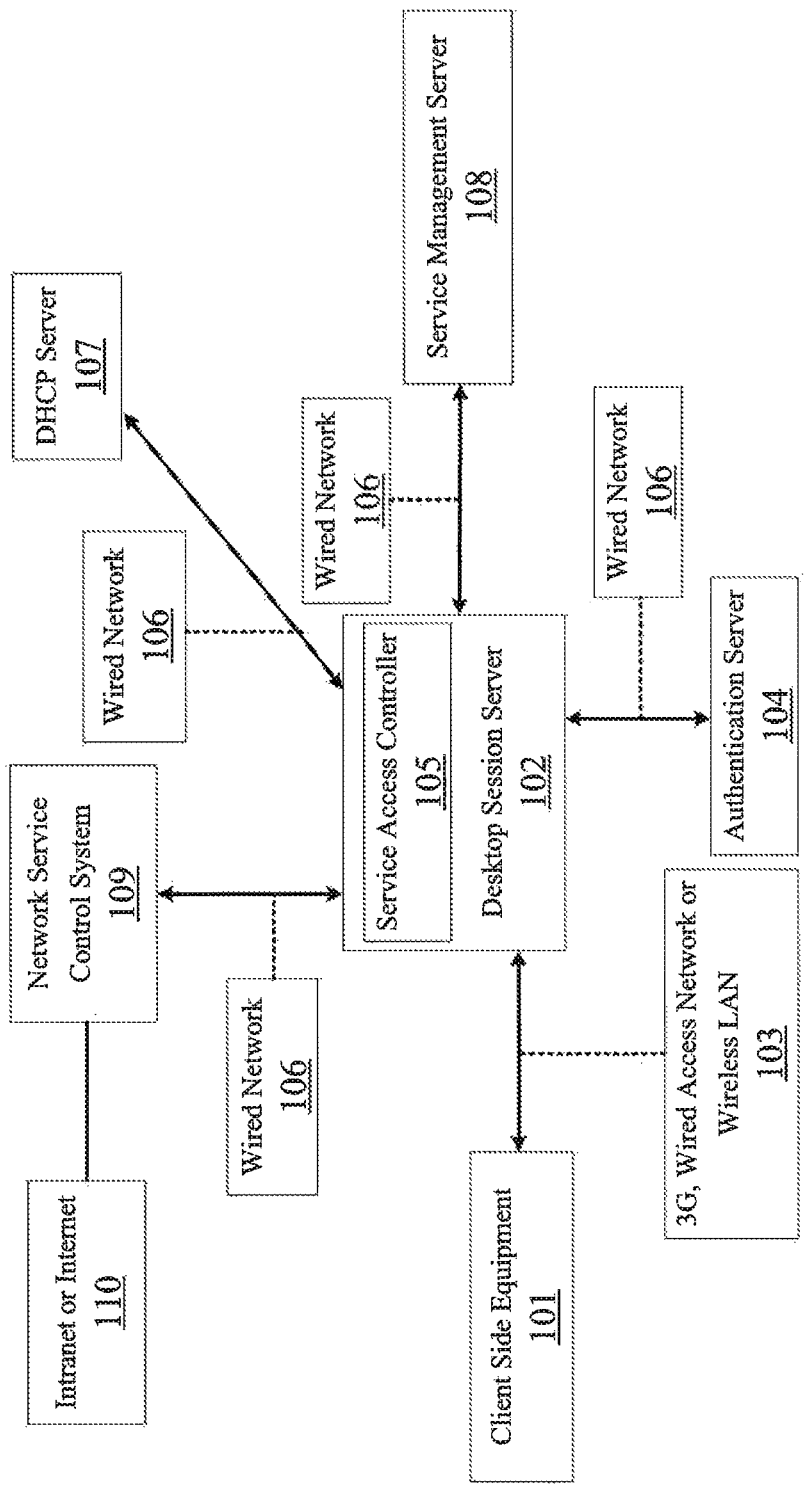
FIG. 1 illustrates a control system for network service and function of virtual desktop application in a cloud computing platform.

Reference is made to FIG. 1 for a view of a control system and method for a network service of a virtual desktop. In FIG. 1, a client side equipment 101 is connected to the network via a 3G, wired access network or wireless LAN 103 to log into a desktop session server 102 for accessing personal desktop service. The desktop session server 102 and an authentication server 104 are connected to and communicating with each other via a wired network 106. The desktop session server 102 configures an IP address of a network gateway to be the IP address of a network service control system 109. The network service control system 109 communicates with a service access controller 105 via the wired network 106. Via the wired network 106, the service access controller 105 helps the client side equipment 101 obtain a virtual desktop service IP address from a DHCP server 107 and transmits information regarding the virtual desktop service IP address to the desktop session server 102 for providing virtual desktop network service. The service access controller 105 can use the wired network 106 and the service management server 108 to transmit a service list. The administrator can configure a user access permission in the service management server 108. The network service control system 109 is connected to the intranet or internet 110 via wired or wireless means.

The client side equipment 101 can comprise a desktop PC, notebook PC, PDA, smart phone, thin client, or any other device which is IP-enabled. The wired network 106 can be the Internet or an intranet of a company. The desktop session server 102 provides workspace services such as remote desktop, virtual desktop and so on. The authentication server 104 can be a LDAP (LDAPs) server or a remote authentication dial-up service (RADIUS) server. The desktop session server 102 can get verification information from the authentication server 104 through suitable communication protocols. The service access controller 105 is responsible for processing the login request from the desktop session server 102, performing message communication, identifying user IP address, inquiring the service list from the service management server 108, helping the user request a virtual desktop IP address, and requesting a service control from the network service control system 109. The service management server 108 is provided for an enterprise administrator to configure a user service group, a service list for the user, and information regarding the service group. Meanwhile, the service management server 108 can only accept an inquiry for information of the user service groups from the service access controller 105.

Figure 2:
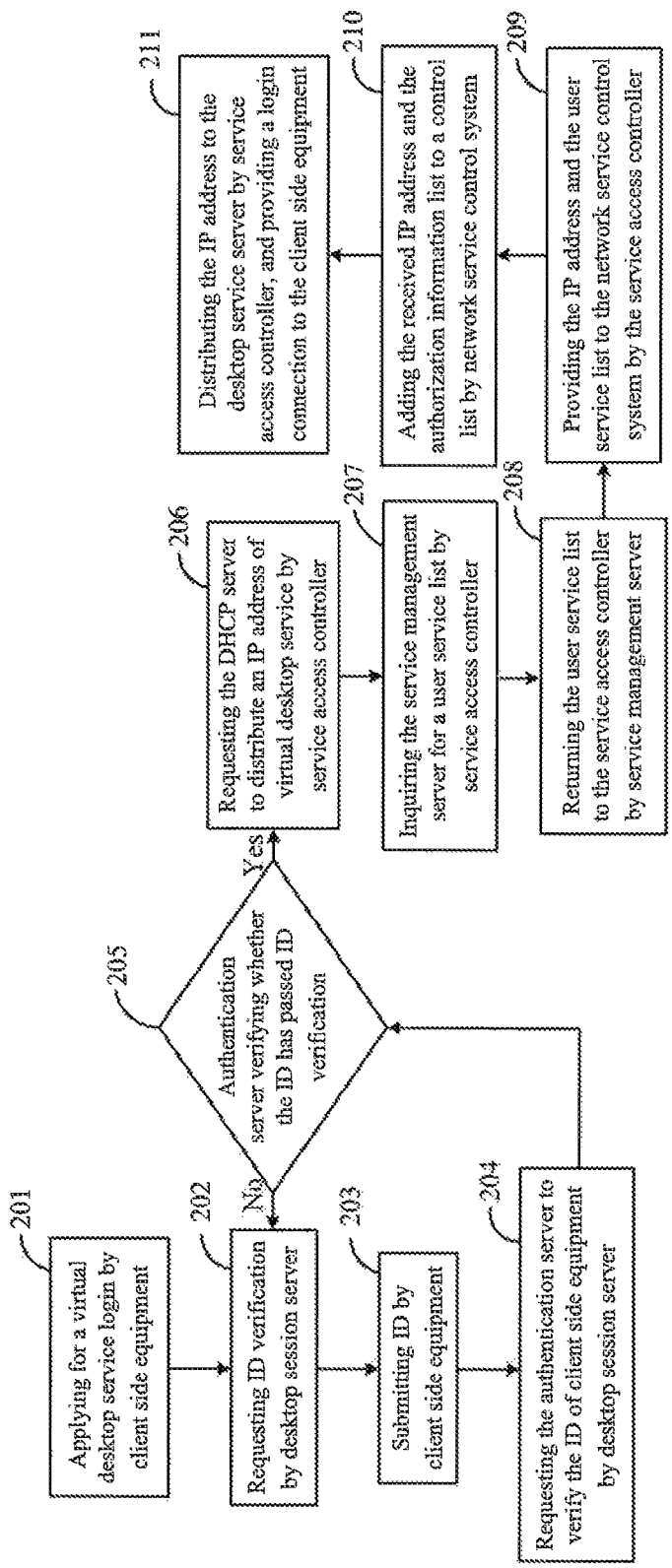
FIG. 2 illustrates a flow chart of the control method of the present invention when a user is logging into the control system.

Reference is made to FIG. 2 for a flow chart of the control method when the client side equipment 101 is logging into the control system, which comprises the following steps:

Step 201: Client side equipment 101 sends a request to the desktop session server 102 for a virtual desktop service login.

Step 202: The desktop session server 102 requests that the client side equipment 101 verify its ID.

Step 203: The client side equipment 101 submits ID information.

Step 204: The desktop session server requests that the authentication server verify the ED of client side equipment 101.

Step 205: If the ID passes the verification after the authentication server 104 has received the ID information of the user, it proceeds to step 206. If it fails to pass the verification, the desktop session server 102 prompts the client side equipment 101 to go back to step 202 to submit new ID information;

Step 206: When the desktop session server 102 is acknowledged by the authentication server 104, the desktop session server 102 requests that the DHCP server 107 distribute an IP address for virtual desktop service via the service access controller 105;

Step 207: The service access controller 105 transmits a user verification data and client side equipment IP address for requesting that the service management server 108 provide a user service list.

Step 208: The service management server 108 returns the user service list to the service access controller 105 after it obtains the user verification data and client side equipment IP address.

Step 209: The service access controller 105 provides the IP address and the user service list in a suitable control information format to the network service control system 109 to request a service control.

Step 210: The network service control system 109 adds the IP address and the information regarding the user service list to a control list and notifies the service access controller 105 to finish the access permission control.

Step 211: When the service access controller 105 obtains the information from the network service control system 109, the service access controller 105 distributes the IP address to the desktop session server 102 and provides a log in connection to the client side equipment 101.

Figure 3:
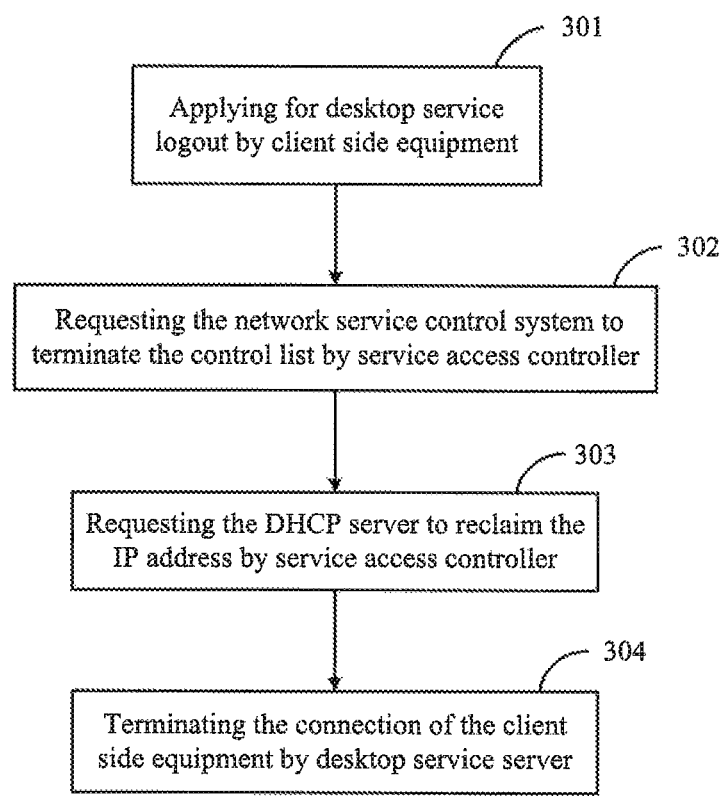
FIG. 3 illustrates a flow chart of the control method of the present invention when a user is logging out of the control system.

Reference is made to FIG. 3 for a flow chart of the control method when the client side equipment 101 is logging out of the control system, which comprises the following steps.

Step 301: The client side equipment 101 applies for a desktop service logout.

Step 302: The service access controller 105 requests that the network service control system 109 terminate the control list and transmit an acknowledgement when the termination is done.

Step 303: The desktop session server 102 requests that the DHCP server 107 reclaim the IP address via the service access controller 105.

Step 304: When the service access controller 105 receives an acknowledgement from the DHCP server 107, it stores a log file of the user connection, deletes the mapping relationship between the virtual desktop service IP address and the client side IP address, and then terminates the connection of the client side equipment 101.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for network service and function of a virtual desktop application in a cloud computing platform, comprising:

a desktop session server including a service access controller, wherein the desktop session server is a connected session server of a remote desktop or a virtual desktop, and when a user uses the service access controller to issue a login request to the desktop session server, the service access controller is used for assisting message communication;

a service management server, connected with the desktop session server via a network and provided for a manager to configure user service groups and information of the user service groups, the service management server accepting an inquiry for information of the user service groups from the service access controller, and the service management server receiving a network service configuration to configure the user service groups;

a network service control system, connecting the service access controller and accepting the network service configuration of the service access controller for the user; and a dynamic host configuration protocol (DHCP) server which helps the user to request distribution of an IP address for a virtual desktop service, and authentication server connected with the desktop session server, wherein at least one of the desktop session server, the service management server, the network service control system and the DHCP server includes a processor and a memory, when the service access controller receives the login request, the service access controller requests the DHCP server to distribute an IP address for a virtual desktop service and then transmits user authentication data received from the authentication server, a client side equipment IP address, and information regarding client side equipment to the service management server to execute an inquiry of a user authorization service list, after the service access controller obtains distribution information of a virtual desktop IP address of the DHCP server and the user authorization service list of the service management server, the service access controller converts the user authorization service list to a control information format and transmits the control information format to the network service control system to execute a service control, after receiving the service control, the network service control system adds the information of the service control to a control function of the network service control system and transmits a notification to the service access controller to finish the user control, and after receiving the notification from the network service control system, the service access controller distributes the virtual desktop IP address to the user and finishes user log in connection.

2. The control system for network service and function of a virtual desktop application in a cloud computing platform of claim 1, wherein the service access controller is connected with the service management server via a network communication protocol to execute an inquiry for the user authorization service list, and the service management server only accepts the inquiry from the service access controller.

3. The control system for network service and function of a virtual desktop application in a cloud computing platform of claim 1, wherein the service control is from an OSI Interconnection Model Layer 3 to an OSI Interconnection Model Layer 7, the service access controller enables or disables the service control of the network service control system via a network communication protocol, when the service access controller enables the service control, the service access controller provides the IP address for the virtual desktop service and the service list, and when the service access controller disables the service control, the service access controller disables a IP routing for a desktop service of the network service control system.

4. A control method for network service and function of a virtual desktop application in a cloud computing platform, comprising the following steps:

using a service access controller of a desktop session server to receive a login request and request distribution of an IP address for a virtual desktop service from a dynamic host configuration protocol (DHCP) server, and then to transmit user authentication data, a client side equipment IP address, and information regarding client side equipment to a service management server to execute an inquiry of a user authorization service list;

after using the service access controller to obtain distribution information of a virtual desktop IP address of the DHCP server and the user authorization service list of the service management server, using the service access controller to convert the user authorization service list to a control information format and transmitting the control information format to a network service control system to execute a service control;

using the network service control system to receive the service control and to add the information of the service control to a control function of the network service control system to transmit a notification to the service access controller to finish the user control; and using the service access controller to receive the notification from the network service control system and to distribute the virtual desktop IP address via the desktop session server for the user to connect and finish user log in connection, wherein the desktop session server includes the service access controller, wherein the desktop session server is a connected session server of a remote desktop or a virtual desktop, and when a user uses the service access controller to issue the login request to the desktop session server, the service access controller is used for assisting message communication, the service management server is connected with the desktop session server via a network and is provided for a manager to configure user service groups and information of the user service groups, the service management server accepting an inquiry for information of the user service groups from the service access controller, and the service management server receiving a network service configuration to configure the user service groups, the network service control system is connected the service access controller and accepting the network service configuration of the service access controller for the user, and the DHCP server helps the user to request distribution of an IP address for the virtual desktop service, and authentication server connected with the desktop session server.

5. The control method for network service and function of a virtual desktop application in a cloud computing platform of claim 4, further comprising the following steps:

using the service access controller to transmit a user desktop connection information to the network service control system and to request termination of the service control;

transmitting a notification to the service access controller to finish the user control after the network service control system terminates the service control of the user connection IP address; and using the service access controller to notify the DHCP server to reclaim the IP address and notify the desktop session server to terminate the user connection.

* * * * *